US012574204B2

(12) United States Patent
Jutla et al.

(10) Patent No.: US 12,574,204 B2
(45) Date of Patent: Mar. 10, 2026

(54) HIGHLY-PARALLEL HARDWARE ARCHITECTURE FOR FULLY HOMOMORPHIC ENCRYPTION (FHE) AND BUTTERFLY-LIKE ALGORITHMS

(71) Applicant: International Business Machines Corporation, Armonk, NY (US)

(72) Inventors: Charanjit Singh Jutla, New York, NY (US); Robert A. Philhower, Valley Cottage, NY (US); Robert K. Montoye, New York, NY (US); Nathan J. Manohar, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 91 days.

(21) Appl. No.: 18/417,002

(22) Filed: Jan. 19, 2024

(65) Prior Publication Data

US 2025/0240149 A1 Jul. 24, 2025

(51) Int. Cl.
*H04L 9/00* (2022.01)

(52) U.S. Cl.
CPC .................................... *H04L 9/008* (2013.01)

(58) Field of Classification Search
CPC ...................................................... H04L 9/008
See application file for complete search history.

(56) References Cited

U.S. PATENT DOCUMENTS

| | | | |
|---|---|---|---|
| 8,595,479 B2 * | 11/2013 | Radhakrishnan ... | H04L 63/0272 |
| | | | 713/153 |
| 9,825,920 B1 * | 11/2017 | Yung .................... | H04L 9/0822 |

| | | |
|---|---|---|
| 10,157,346 B2 | 12/2018 | Steele, Jr. et al. |
| 11,029,954 B2 | 6/2021 | Fung et al. |
| 11,126,439 B2 | 9/2021 | Burns et al. |
| 11,256,518 B2 | 2/2022 | Wang et al. |
| 11,645,084 B2 | 5/2023 | Burns et al. |

(Continued)

OTHER PUBLICATIONS

Anonymous, "A Unified Scalar and SIMD Instruction Set Architecture Repurposing a Scalar Instruction Set for SIMD Instruction via Mode-Sensitive Semantics," IP.com No. IPCOM000241485D, May 5, 2015, 4 pages.

(Continued)

*Primary Examiner* — Viral S Lakhia
(74) *Attorney, Agent, or Firm* — CANTOR COLBURN LLP; Edward Wixted

(57) ABSTRACT

An apparatus including a computer architecture is provided. The computer architecture includes: a register file; computing engines; and routing circuitry. The apparatus is configured to determine a target configuration associated with one or more computing engines and one or more register banks of the register file or a partition of the register file, based on a target parallelism and a target processing scope for processing data stored at the one or more register banks. The apparatus is configured to couple the one or more computing engines to the one or more register banks, using the routing circuitry, based on the target configuration. The apparatus is configured to perform, by the one or more computing engines and based on the coupling and the target configuration, one or more computing operations on data stored at one or more respective registers of the one or more register banks.

18 Claims, 10 Drawing Sheets

100

(56) References Cited

U.S. PATENT DOCUMENTS

| | | | | |
|---|---|---|---|---|
| 11,777,711 | B1 * | 10/2023 | Satpathy | G06F 21/72 |
| | | | | 713/153 |
| 12,143,467 | B2 * | 11/2024 | Joye | H04L 9/3026 |
| 12,231,532 | B1 * | 2/2025 | Maiti | H04L 9/0819 |
| 2016/0224902 | A1 | 8/2016 | Steele, Jr. et al. | |
| 2019/0363872 | A1 * | 11/2019 | Shim | H04L 9/0618 |
| 2020/0334037 | A1 | 10/2020 | Fung et al. | |
| 2021/0109761 | A1 | 4/2021 | Wang et al. | |
| 2021/0149679 | A1 | 5/2021 | Burns et al. | |
| 2022/0114285 | A1 * | 4/2022 | Biernacki | H04L 9/003 |
| 2022/0140997 | A1 * | 5/2022 | Lam | H04L 9/008 |
| | | | | 713/168 |
| 2022/0271914 | A1 * | 8/2022 | Diallo | H04L 9/0825 |
| 2023/0088897 | A1 * | 3/2023 | Wang | G06N 20/00 |
| | | | | 706/12 |
| 2023/0269067 | A1 * | 8/2023 | Son | H04L 9/008 |
| | | | | 380/28 |
| 2024/0015004 | A1 * | 1/2024 | Chatterjee | G06F 9/30141 |
| 2024/0281537 | A1 * | 8/2024 | Gupta | G06F 21/575 |
| 2025/0007687 | A1 * | 1/2025 | Mathew | H04L 9/008 |

OTHER PUBLICATIONS

Anonymous, "SIMD MAC Design with Work Stealing for Sparse Computations," IP.com No. IPCOM000269791D, May 11, 2022, 4 pages.

El-Rewini et al., "Introduction to Advanced Computer Architecture and Parallel Processing," Advanced Computer Architecture and Parallel Processing, 2005, 18 pages.

Kim et al., "Hardware Architecture of a Number Theoretic Transform for a Bootstrappable RNS-based Homomorphic Encryption Scheme," IEEE 28th Annual International Symposium of Field-Programmable Custom Computing Machines (FCCM), 2020, pp. 56-64.

Samardzic et al., "CraterLake: A Hardware Accelerator for Efficient Unbounded Computation on Encrypted Data," ISCA '22, Jun. 18-22, 2022, 15 pages.

* cited by examiner

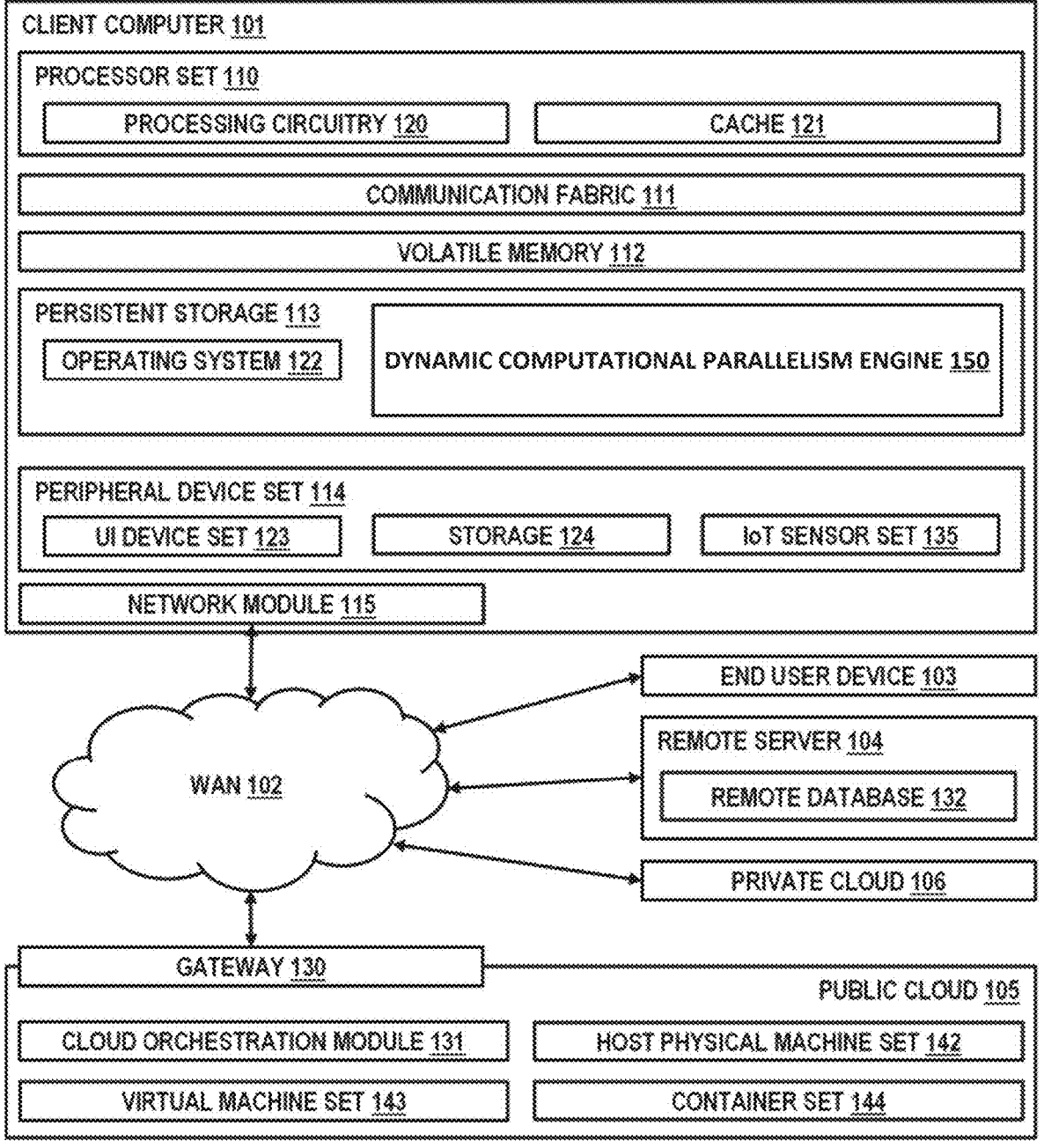

CLIENT COMPUTER 101

PROCESSOR SET 110

PROCESSING CIRCUITRY 120        CACHE 121

COMMUNICATION FABRIC 111

VOLATILE MEMORY 112

PERSISTENT STORAGE 113

OPERATING SYSTEM 122        DYNAMIC COMPUTATIONAL PARALLELISM ENGINE 150

PERIPHERAL DEVICE SET 114

UI DEVICE SET 123        STORAGE 124        IoT SENSOR SET 135

NETWORK MODULE 115

WAN 102

END USER DEVICE 103

REMOTE SERVER 104

REMOTE DATABASE 132

PRIVATE CLOUD 106

GATEWAY 130

PUBLIC CLOUD 105

CLOUD ORCHESTRATION MODULE 131        HOST PHYSICAL MACHINE SET 142

VIRTUAL MACHINE SET 143        CONTAINER SET 144

32 Register
Banks

510

MUXES
And
Cross-bar

520

32 ALUs
525

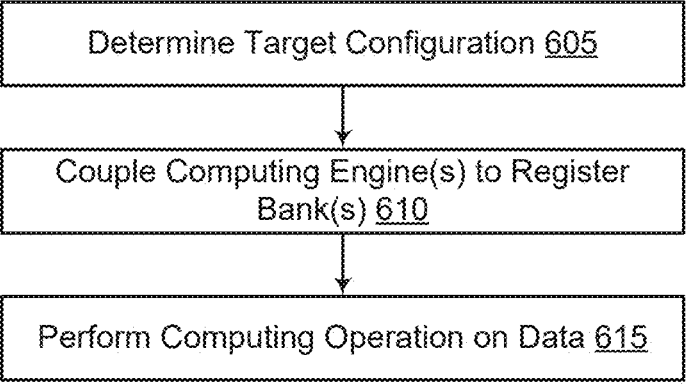
Determine Target Configuration 605
↓
Couple Computing Engine(s) to Register Bank(s) 610
↓
Perform Computing Operation on Data 615
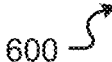
600
FIG. 6

HIGHLY-PARALLEL HARDWARE ARCHITECTURE FOR FULLY HOMOMORPHIC ENCRYPTION (FHE) AND BUTTERFLY-LIKE ALGORITHMS

BACKGROUND

The present disclosure generally relates to parallel computing, and more specifically, to a hardware architecture supportive of dynamic computational parallelism for data oblivious computing such as for example, fully-homomorphic encryption (FHE), butterfly-like algorithms, and matrix-multiplication.

Some processing techniques may utilize highly parallel computing engines in association with performing one or more algorithmic operations. In some cases, some processing techniques may utilize parallel computing engines for performing matrix-multiplication or butterfly-like algorithms such as, for example, Fast Fourier Transform (FFT), butterfly-sorting, and permuting data. However, building a parallel hardware architecture capable of executing the algorithmic operations (e.g., in full parallelism of the hardware architecture) can be prohibitive due to cost overhead.

SUMMARY

Embodiments of the present disclosure are directed to an apparatus including a computer architecture. The computer architecture includes: a register file; a plurality of computing engines; and routing circuitry. The apparatus is configured to determine a target configuration associated with one or more computing engines of the plurality of computing engines and one or more register banks of the register file or a partition of the register file, based on a target parallelism and a target processing scope for processing data stored at the one or more register banks by the one or more computing engines. The apparatus is configured to couple the one or more computing engines to the one or more register banks, using the routing circuitry, based on the target configuration. The apparatus is configured to perform, by the one or more computing engines and based on the coupling and the target configuration, one or more computing operations on data stored at one or more respective registers of the one or more register banks.

In addition to one or more of the features described herein, the routing circuitry may include a plurality of multiplexers and be absent all-to-all crossbar circuitry. In addition to one or more of the features described herein, the plurality of multiplexers comprises a binary tree of multiplexers, and each multiplexer comprised in the binary tree of multiplexers is controlled by a select bit.

Embodiments also include a computer-implemented method. According to an aspect, the computer-implemented method includes determining a target configuration of a computer architecture including a register file, a plurality of computing engines, and routing circuitry. The target configuration is associated with one or more computing engines of the plurality of computing engines and one or more register banks of the register file or a partition of the register file, and determining the target configuration is based on a target parallelism and a target processing scope for processing data stored at the one or more register banks by the one or more computing engines. The method also includes coupling the one or more computing engines to the one or more register banks, using the routing circuitry, based on the target configuration. The method also includes performing, by the one or more computing engines and based on the target configuration, a computing operation on data stored at one or more respective registers of the one or more register banks.

Embodiments also include a computing system having a memory having computer readable instructions and one or more processors for executing the computer readable instructions. The computer readable instructions controlling the one or more processors to perform operations that include determining a target configuration of a computer architecture including a register file, a plurality of computing engines, and routing circuitry. The target configuration is associated with one or more computing engines of the plurality of computing engines and one or more register banks of the register file or a partition of the register file, and determining the target configuration is based on a target parallelism and a target processing scope for processing data stored at the one or more register banks by the one or more computing engines. The operations also include coupling the one or more computing engines to the one or more register banks, using the routing circuitry, based on the target configuration. The operations also include performing, by the one or more computing engines and based on the target configuration, a computing operation on data stored at one or more respective registers of the one or more register banks.

Additional technical features and benefits are realized through the techniques of the present disclosure. Embodiments and aspects of the disclosure are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the present disclosure are apparent from the following detailed description taken in conjunction with the accompanying drawings in which:

FIG. 1 depicts a block diagram of an example computing system for use in conjunction with one or more embodiments of the present disclosure.

FIG. 5 depicts a block diagram of a computing system in accordance with some other approaches.

FIG. 6 depicts a flowchart of a method in accordance with one or more embodiments of the present disclosure.

DETAILED DESCRIPTION

Figure 2:
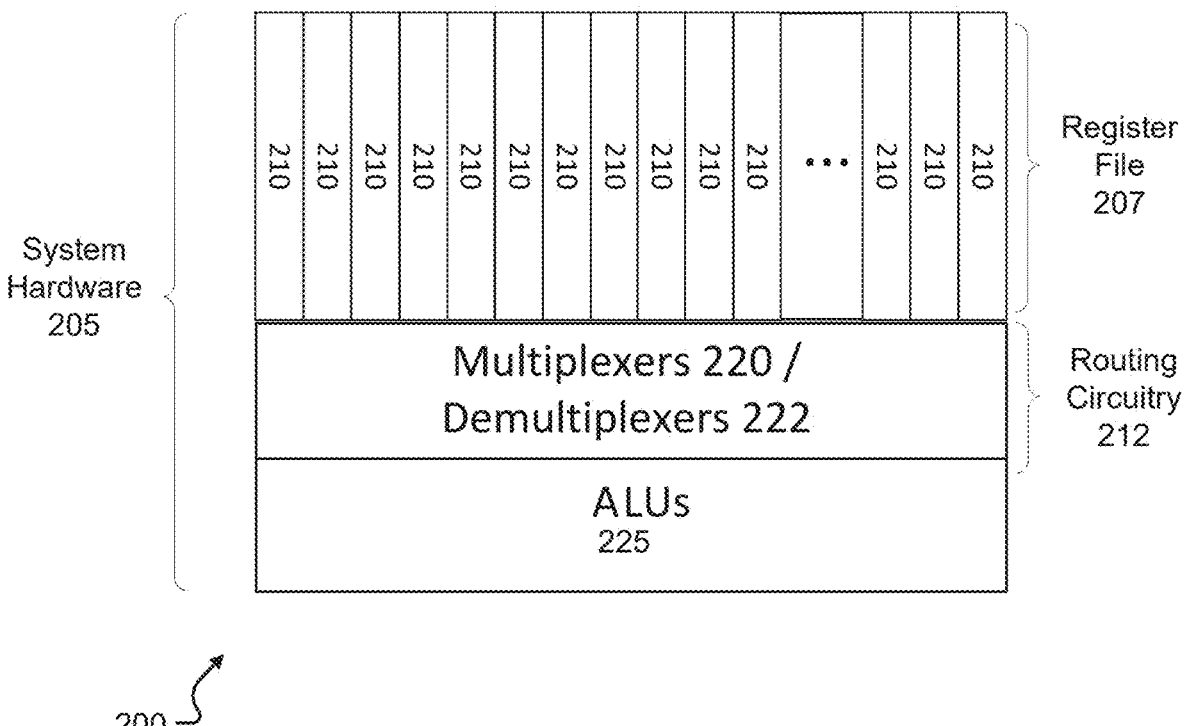
FIG. 2 depicts a block diagram of an example computing system for use in conjunction with one or more embodiments of the present disclosure.

Some processing techniques may utilize highly parallel computing engines in association with performing one or more algorithmic operations. In some cases, some processing techniques may utilize parallel computing engines for matrix-multiplication or performing butterfly-like algorithms such as, for example, Fast Fourier Transform (FFT), butterfly-sorting, and permuting data.

FFTs in the modular arithmetic domain are also known as Number Theory Transforms (NTT). In some cases, FFT is a key algorithmic step in Fully Homomorphic Encryption (FHE) evaluations. Some approaches include speeding up such algorithms using parallel hardware to make FHE practical, as FHE involves performing NTT on large vectors (e.g., 10,000 components or more). In some cases, NTTs can be computed using butterfly algorithms such as, for example, the Cooley-Tukey algorithm. However, building massively parallel hardware to execute butterfly algorithms at full computational parallelism of the hardware can be prohibitively expensive. In some cases, in addition to costs associated with implementing the processing circuitry for the performing parallel operations, implementing routing circuitry for interconnecting the various (parallel) computing engines to the shared set of registers (register file) can be cost prohibitive.

In accordance with one or more embodiments of the present disclosure, systems and techniques are described which support highly parallel data-oblivious computing. For example, some modern high performance computing tasks are data oblivious. Non-limiting examples of computing supported by the systems and techniques described herein include large matrix multiplication for foundation models, FHE for data privacy in cloud computing, sorting, and other butterfly-like algorithms.

In some cases, FHE allows running a program on encrypted data. For example, FHE may be beneficial for cases in which a program to be run is proprietary and maintained by cloud operator or in which data is NOT decrypted in the "enclave" or cloud. As the program can still be run on the encrypted data, FHE supports homomorphism. Non-limiting examples of programs which may benefit from FHE include credit card fraud detection, sleep apnea ECG diagnosis, drone control, and the like. For security and technical reasons, FHE includes running the program using massive polynomial multiplications such as, for example, FFTs. In some cases, FFTs enable relatively fast polynomial multiplication. FFTs are butterfly algorithms (e.g., butterfly sort).

In some embodiments, a general-purpose hardware architecture supportive of highly parallel data-oblivious computing is provided, aspects of which are described herein. In some aspects, the general-purpose hardware architecture provides increased design and application flexibility compared to systolic arrays, ASICs, and GPUs. In some examples, the general-purpose hardware architecture described herein has a reduced architecture complexity and simplified programming models compared to other approaches for parallel computing (e.g., parallel data-oblivious computing). In some embodiments, the general-purpose hardware architecture and programming models may be implemented without branches (e.g., conditional statements, loops, and the like) or with a reduced quantity of branches compared to other approaches.

In accordance with one or more embodiments of the present disclosure, the hardware architectures described herein support relatively large register files (e.g., having 128 architected registers) and arrays of ALUs. In some aspects, the hardware architectures support arrays of register files and associated ALUs, in which the ALUs are all executing the same program. For example, the ALUs may be single-instruction, multiple data (SIMD) hardware components capable of performing the same operation on multiple data operands concurrently. The hardware architectures described herein support increased effectiveness in the interaction of data in different register banks, example aspects of which are later described herein.

The hardware architectures and techniques described herein may overcome problems in some other computing approaches, as some existing computation tasks (e.g., foundation models, FHE, and the like) cannot fit even in large register files. For example, such existing computation tasks may be restrained to using larger scratchpads with load/save from register files, and much of the related data interaction may be relegated to scratchpad load/save.

The hardware architectures and techniques described herein support the ability of ALUs to scope into various register scope s (e.g., for increased processing speed), which are sets of register banks from the register file, while providing a dynamic approach that supports trading off register scoping for general purpose parallel computing. As will be described herein, the dynamic approach in accordance with one or more embodiments of the present disclosure supports register scoping while mitigating increases in silicon overhead compared to other hardware architectures. For example, some other hardware architecture approaches for register scoping build expensive crossbars or have small parallelism in a core.

As will be described herein, a full set of registers is referred to as a "register file." The smallest partitioning of the registers in the register file is referred to as a "register bank." The hardware supports various levels of partitioning of the register file. This is referred to as the "register scope" or "partitioning of the register file," and the partitioning of the register file is called the "split." This partitioning associates consecutive register banks with the appropriate ALU. For example, at maximum split, each register bank is associated with an ALU. At the next level (second from maximum split), a pair of register banks is associated with an ALU. Again, at the next level, four consecutive register banks are associated with an ALU.

The partitioning process continues until at the lowest split (split of 1), all the register banks (that is, the entire register file) is associated with a single ALU. The parallelism is determined by the number of consecutive register banks that an instruction is to operate on. For example, if the instruction is to operate on a single register bank, the hardware architecture can operate at maximum split. If the instruction is to operate on registers in a pair of consecutive banks, the hardware architecture can operate at the next level (second from maximum split). If the instruction is to operate on registers across the entire register file, then the hardware architecture may be configured to use a split of 1, without any parallelism.

According to one or more embodiments of the present disclosure, the hardware architecture described herein may include up to 1024 parallel computing engines in a core. Aspects supported by the present disclosure provide a general computer architecture which is highly beneficial for parallel processing of butterfly algorithms while reducing costs for interconnecting components of the architecture compared to other approaches (e.g., crossbar-based approaches).

The systems and techniques described herein support the cross-computation or communication between register banks (of a partitioned register file) and ALUs, which may be highly systematic in butterfly algorithms such as, for example, FFTs. For example, FFTs may be used for large integer multiplication, as well as for large degree polynomial multiplication. In some cases, large degree polynomial multiplication may be the main costly component of FHE.

In example embodiments described herein, a general-purpose computer architecture is described that is capable of highly parallel data-oblivious computing. The computer architecture may include N register banks, each including M registers, and N arithmetic logic units (ALUs), where N and M are integer values. In some embodiments, each of the N ALUs is associated with each of the N register banks, with addressing capability into each associated register bank.

In some embodiments, the computer architecture supports dynamic tradeoff in managing parallelism (e.g., reducing parallelism) with wider addressing scope into other register banks. For example, the systems and techniques described herein may inversely adjust parallelism with respect to adjusting addressing scope. In an example, the systems and techniques described herein may include increasing parallelism while decreasing the addressing scope (and similarly, decreasing parallelism while increasing the addressing scope). In some aspects, the dynamic address scoping may be on a per instruction level. The systems and techniques described herein support implementing the dynamic computational parallelism using existing multiplexer circuitry and combinatorial logic for addressing the register banks, while mitigating increases in cost overhead due to added circuitry, associated chip area, and the like.

Example aspects of the hardware architecture and supported features are described with reference to the following figures.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as dynamic computational parallelism engine 150. In addition to dynamic computational parallelism engine 150, computing environment 100 includes, for example, computer 101, wide area network (WAN) 102, end user device (EUD) 103, remote server 104, public Cloud 105, and private Cloud 106. In this embodiment, computer 101 includes processor set 110 (including processing circuitry 120 and cache 121), communication fabric 111, volatile memory 112, persistent storage 113 (including operating system 122 and dynamic computational parallelism engine 150, as identified above), peripheral device set 114 (including user interface (UI), device set 123, storage 124, and Internet of Things (IoT) sensor set 135), and network module 115. Remote server 104 includes remote database 132. Public Cloud 105 includes gateway 130, Cloud orchestration module 131, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 132. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a Cloud, even though it is not shown in a Cloud in FIG. 1. On the other hand, computer 101 is not required to be in a Cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in dynamic computational parallelism engine 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in dynamic computational parallelism engine 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 135 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collects and store helpful and useful data for use by other computers, such as computer 101. For example, in a hypothetical case where computer 101 is designed and programmed to provide a recommendation based on historical data, then this historical data may be provided to computer 101 from remote database 132 of remote server 104.

PUBLIC CLOUD 105 is any computer system available for use by multiple entities that provides on-demand availability of computer system resources and/or other computer capabilities, especially data storage (Cloud storage) and computing power, without direct active management by the user. Cloud computing typically leverages sharing of resources to achieve coherence and economies of scale. The direct and active management of the computing resources of public Cloud 105 is performed by the computer hardware and/or software of Cloud orchestration module 131. The computing resources provided by public Cloud 105 are typically implemented by virtual computing environments that run on various computers making up the computers of host physical machine set 142, which is the universe of physical computers in and/or available to public Cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 131 manages the transfer and storage of images, deploys new instantiations of VCEs and manages active instantiations of VCE deployments. Gateway 130 is the collection of computer software, hardware, and firmware that allows public Cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public Cloud 105, except that the computing resources are only available for use by a single enterprise. While private Cloud 106 is depicted as being in communication with WAN 102, in other embodiments a private Cloud may be disconnected from the internet entirely and only accessible through a local/private network. A hybrid Cloud is a composition of multiple Clouds of different types (for example, private, community or public Cloud types), often respectively implemented by different vendors. Each of the multiple Clouds remains a separate and discrete entity, but the larger hybrid Cloud architecture is bound together by standardized or proprietary technology that enables orchestration, management, and/or data/application portability between the multiple constituent Clouds. In this embodiment, public Cloud 105 and private Cloud 106 are both part of a larger hybrid Cloud.

A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

FIG. 2 depicts a block diagram of an example computing system 200 that supports dynamic computational parallelism in accordance with one or more embodiments of the present disclosure.

All or a portion of the computing system 200 shown in FIG. 2 can be implemented, for example, by all or a subset of the computing environment 100 of FIG. 1. In one or more embodiments, the computing system 200 is embodied in a computer 101 as the one shown in FIG. 1. In one or more embodiments, the computing system 200 is embodied in an end user device 103 as the one shown in FIG. 1. In some examples, the computing system 200 may include dynamic computational parallelism engine 150 of FIG. 1.

The computing system 200 may be integrated with or be electrically coupled to a user interface (not illustrated). The user interface can be implemented by device set 123 of FIG. 1. The computing system 200 may provide (e.g., visually, audibly, and the like) information associated with processing of data by the computing system 200 (and the system hardware 205) via the user interface 223.

The computing system 200 includes system hardware 205. The system hardware 205 includes the central processing units (CPUs), graphical processing units (GPUs), memory, and the like that are part of the computing system. The system hardware 205 executes computer code stored at a memory (e.g., volatile memory 112, persistent storage 113, storage 124, and the like described with reference to FIG. 1) of the computing system 200.

The system hardware 205 may include a register file 207 (including register banks 210), routing circuitry 212 (including combinatorial logic 215 and multiplexers 220 (also referred to herein as multiplexer circuitry), and arithmetic logic units (ALUs) 225, example aspects of which are described herein.

Combinatorial logic 215 may include logic circuitry. For example, the combinatorial logic 215 may include logic gates (e.g., logical AND gates, logical OR gates, and the like). The combinatorial logic 215 may be referred to as dynamic split combinatorial logic. Example aspects of the combinatorial logic 215 are later described herein.

Multiplexers 220 include circuitry configurable to select between several input signals and forward the selected input to an output line. In an example, the multiplexers 220 may be 2:1 multiplexers. In an example, the system hardware 205 may include 64 multiplexers 220 (2:1 multiplexers), thereby providing a total of 128 multiplexers (e.g., 64×2=128 multiplexers). Example aspects of the multiplexers 220 are later described herein.

The ALUs 225 are combinational circuits capable of performing arithmetic, logic, and other related operations. The ALUs 225 may be part of processor set 110 and/or dynamic computational parallelism engine 150. For example, each ALU 225 is capable of performing arithmetic, logic, shift, bit manipulation, or select operations, or the like, on content provided from one or more register banks 210. The ALUs 225 may be referred to herein as computing engines. In one or more embodiments, the ALUs 225 are capable of and may be configured for performing operations in parallel.

According to one or more embodiments of the present disclosure, the computing system 200 provides a general-purpose hardware architecture that supports instruction-level virtual re-organization of a register file 207 so as to feed multiple computing engines (e.g., ALUs 225) in a SIMD (single-instruction-multiple-data) manner. For example, the systems and techniques described herein support instruction-level virtual re-organization of a register file 207 into multiple register banks 210.

In some aspects, the instruction-level virtual re-organization may include partitioning the register file 207 into multiple register banks 210, example aspects of which are described herein. A register bank 210 may also be referred to as a register set or a set of registers. It is to be understood that the examples described herein with reference to ALUs 225 are not limited to ALUs and may be implemented by other processing circuitry capable of performing the features described herein with reference to the ALUs 225.

Example aspects of the techniques described herein are described with reference to some other computing techniques. In an example, some other computing techniques may be implemented with relatively expensive inter-connectedness and general register addressing capability, treating the whole register file 207 as one monolithic file with arbitrary parallel addressing ability by various computing engines.

In contrast, for example, the systems and techniques described herein may achieve the same end result as other computing techniques, but with a reduced computational overhead and without unnecessarily increasing the addressing capability of the parallel ALUs 225 (e.g., and thereby, without increasing processing overhead, processing complexity, and cost).

Figure 3A:
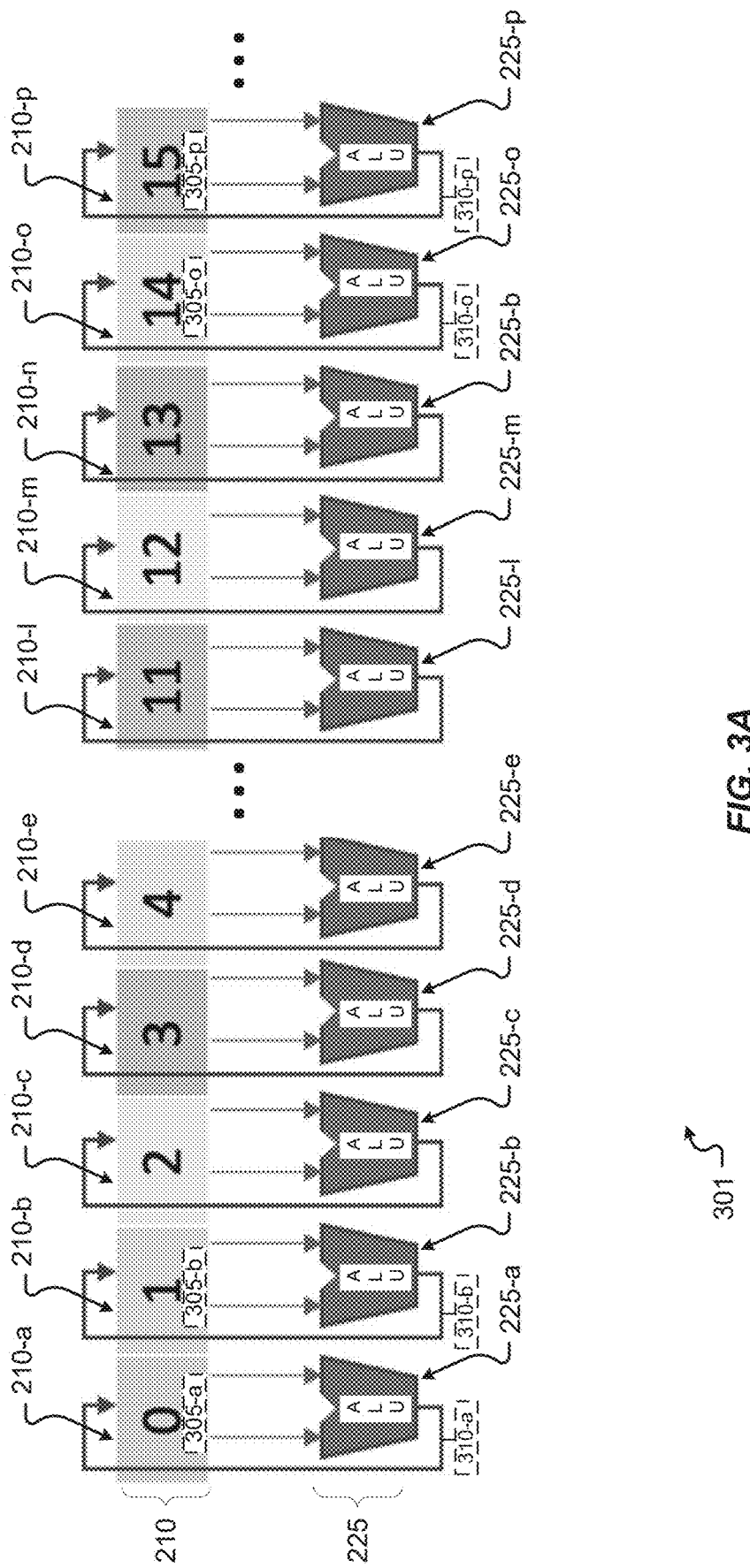
FIGS. 3A through 3C are block diagrams illustrating example configurations of a computing system in accordance with one or more embodiments of the present disclosure.
Figure 3B:
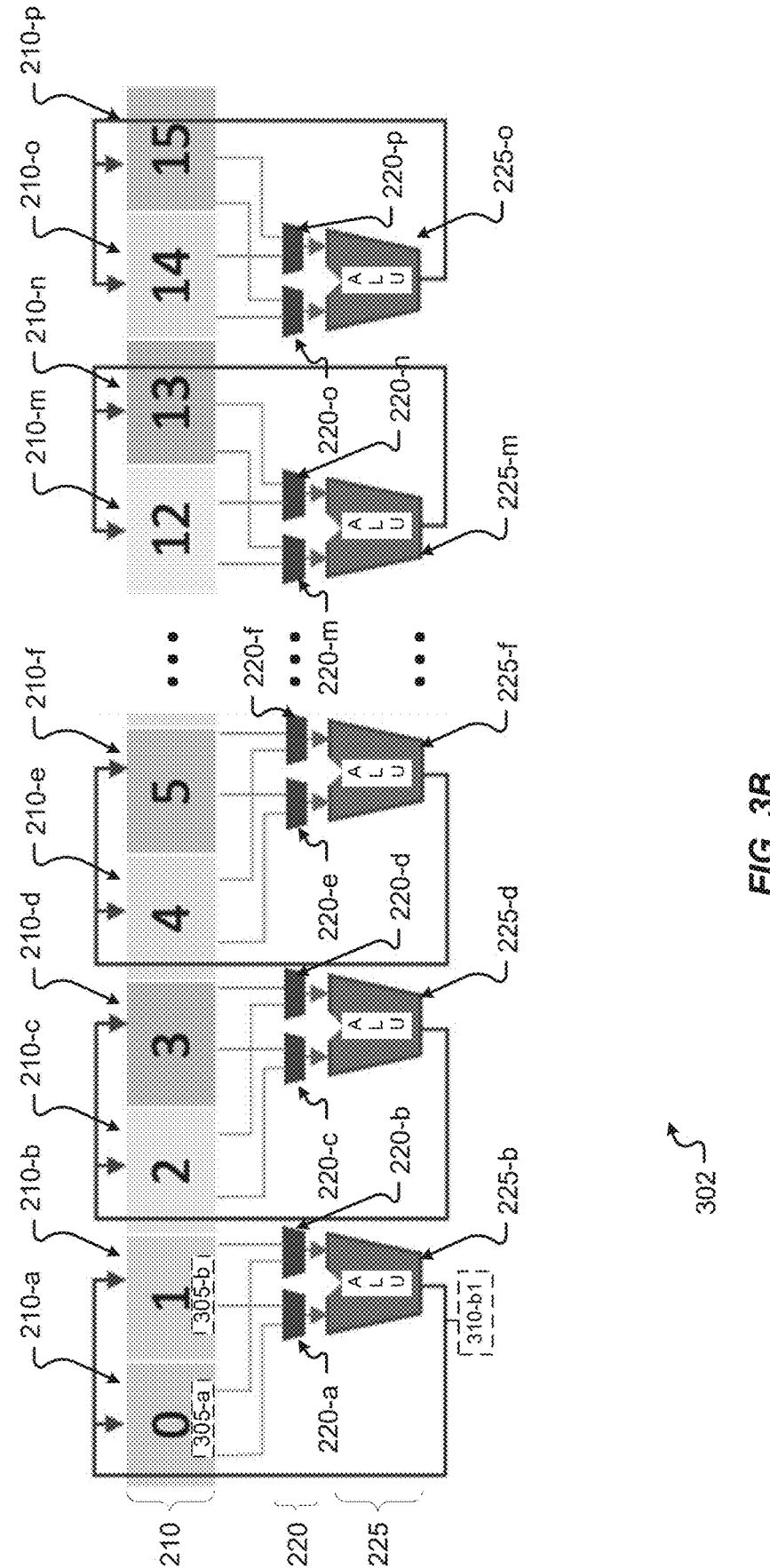

In particular, for example, the system hardware 205 may include multiplexer circuitry (e.g., multiplexers 220) capable of addressing registers in the entire register file 207. The parallel ALUs 225 may utilize the same multiplexer circuitry (or portions of the multiplexer circuitry) to respectively address registers in consecutive register banks 210 associated with the current register scope (split level), but with the same (address) offset in each partition. In some embodiments, the systems and techniques described herein may support the partitioning of the register file 207 to 16-fold (e.g., as illustrated at FIG. 3A), 8-fold (e.g., as illustrated at FIG. 3B), 4-fold, 2-fold, and, all the way to 1-fold, respectively enabling 16-way SIMD to 1-way SIMD parallel operation. In some embodiments, the systems and techniques described herein may support the partitioning of the register file 207 to 32-fold and higher. For ease of description and not to be limited thereto, the examples described herein are described with reference to a 16-way maximum split (e.g., 16-fold partitioning of the register file 207), example aspects of which are later described with reference to FIGS. 3A through 3C.

In accordance with one or more embodiments of the present disclosure, the hardware architecture may support the implementation and performance of number-theory transforms (NTT), butterfly algorithms, and butterfly-like algorithms at near the same computational efficiency as an ideal parallel machine, but with a comparatively reduced cost. For example, the costs associated with building an ideal parallel machine may be substantially higher than the parallel processing capabilities of the computing system 200 as described herein. The term ideal parallel machine may refer to a machine where all ALUs can simultaneously compute on data in any register in the register file provided the ALUs write to different output locations. An ideal parallel machine has no cost associated with transferring the data from the register file to the ALUs and back.

According to one or more embodiments of the present disclosure, the computing system 200 described herein may be a single chip including a set of ALUs 225 capable of accessing the register file 207, in which the register file 207 is common to the ALUs 225.

Aspects of the computing system 200 as described herein provide a reduction in overhead associated with other techniques, while still supporting cross-computation. For example, for some other approaches in which each ALU of an IC chip is capable of accessing each register of a common register file, the logic associated with providing interconnectivity between each ALU to each register (for accessing each register) may be 10 times the size of the circuit area associated with all ALUs and the full register file. Further, for example, as will be described herein, the systems and techniques described herein provide increased flexibility compared to some other approaches in which a register file may be limited to being portioned with one partition per ALU.

As will be described herein, the computing system 200 includes logic (e.g. multiplexers 220, demultiplexers 222) capable of providing systematic cross-computation of the ALUs 225. The multiplexers 220 are from the register banks 210 to the ALUS 225, and the demultiplexers 222 are from the ALUs 225 to the register banks 210. For example, the computing system 200 may support configurations (also referred to herein as modes) for computation of data included in the register file 207 by multiple ALUs 225 (e.g., all ALUs 225, a portion of the ALUs 225) in parallel. In some examples, the computing system 200 may support configurations for computation of the data by a single ALU 225 (e.g., full register file reference in a non-parallel setting). In the example of computation of the data by a single ALU 225, the computing system 200 may implement the configuration while mitigating the amount of added overhead with respect to the existing logic.

In some embodiments of the computing system 200, the logic (e.g., multiplexers 220, demultiplexers 222) for switching between different configurations (or 'modes') may be designed such that every ALU 225 has access to every register of the register file 207. In some other embodiments of the computing system 200, the logic (e.g., multiplexers 220, demultiplexers 222) for switching between different configurations (or 'modes') may be designed such that not every ALU 225 has access to every register of the register file 207. Accordingly, for example, for systematic butterfly algorithms, the computing system 200 may implement a maximum parallelism supported by the computing system 200 for some rounds of the butterfly algorithm and implement a less than maximum parallelism supported by the computing system 200 for some other rounds of the butterfly algorithm. The computing system 200 described herein has a substantially reduced cost compared to full access parallelism implemented in some other approaches.

In some examples, the parallelism of ALUs 225 available on the computing system 200 (e.g., chip) can also be used for algorithms which are inherently completely parallel (e.g., whether SIMD parallel or absolutely independently parallel). Accordingly, for example, the computing system 200 described herein may be used for training of large deep learning neural networks (e.g., foundations model training).

According to one or more embodiments of the present disclosure, the computing system 200 may support dynamic computational parallelism, example aspects of which are described with reference to FIGS. 3A through 3C and FIGS. 4A through 4C. In some embodiments, the dynamic computational parallelism may be implemented with or without combinatorial logic 215. Examples implemented without combinatorial logic 215 are later described with reference to FIGS. 4A and 4B. An example implemented with combinatorial logic 215 is later described with reference to FIG. 4C.

Figure 3C:
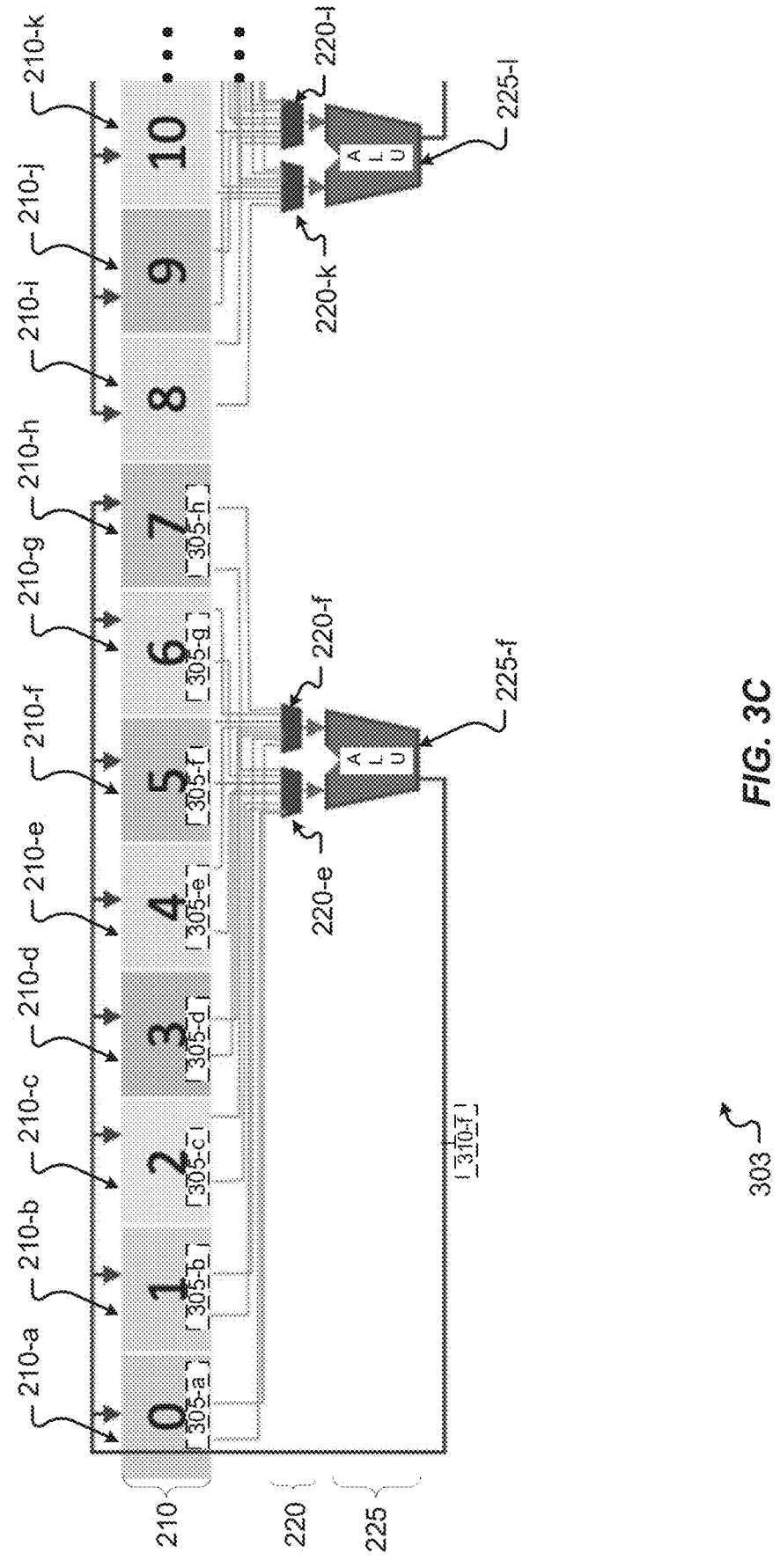

FIGS. 3A through 3C are block diagrams illustrating example configurations 301 through 303 of the computing system 200 in accordance with one or more embodiments of the present disclosure. The example configurations 301 through 303 are example logical views illustrative of dynamic computational parallelism supported by the computing system 200.

The examples of FIGS. 3A through 3C illustrate 16 architected register banks 210 (e.g., register bank 210-a (register bank '0') through register bank 210-p (register bank '15')). However, the hardware architecture of the computing system 200 is not limited thereto. In an example, the hardware architecture may include 64 register banks 210. In another example, the hardware architecture may include 128 register banks 210. For simplicity in association with describing example aspects of the configurations 301 through 303, the labels associated with some repeated elements (e.g., repeated register banks 210, repeated combinatorial logic 215, repeated multiplexers 220, repeated ALUs 225, and the like) are omitted.

In accordance with one or more embodiments of the present disclosure, the computing system 200 supports dynamically trading computation parallelism (e.g., in the manner of single-instruction, multiple data (SIMD)) against register file scope. Register file scope refers to the portion of the register file 207 that can be accessed by a particular ALU 225 in a particular computational mode. The terms register file scope, processing scope, and ALU data scope may be used interchangeably herein.

The example aspects of the computing system 200 and configurations as described herein support the sharing of data across SIMD lanes for highly parallel cores, which may be beneficial for reduction-type operations (e.g., FFT, NTT, butterfly operations, and the like) and FHE computations.

Referring to the example configuration 301 of FIG. 3A, the computing system 200 may provide a computation model having a maximum configurable computational parallelism (and lowest configurable register file scope, in which each ALU 225 is associated with one register bank 210) as supported by the computing system 200 in accordance with one or more embodiments of the present disclosure. In an example, with reference to configuration 301, each of the register banks 210 drives a private ALU 225. That is, for example, at maximum computational parallelism, each of 64 register banks (of 32-entries each) drives a private ALU 225.

As illustrated in the configuration 301 of FIG. 3A, all of ALUs 225 (e.g., ALU 225-a through ALU 225-p) are active, and each ALU 225 is driven by a respective register bank 210. In some aspects, in the example configuration 301, each of the register banks 210 is directly or indirectly coupled to a corresponding ALU 225. For example, each of the register banks 210 (and included registers) may be directly or indirectly coupled to a corresponding ALU 225 via one or more multiplexers 220 (not illustrated at FIG. 3A).

Each ALU 225 may read and process data stored in a register (or registers) of a corresponding register bank 210.

In an example, each ALU 225 may store or provide generated data or processed data to a register of a corresponding register bank 210.

For example, ALU 225-a may read and process data 305-a stored in a register included in a register bank 210-a. ALU 225-a may generate data 310-a based on processing the data 305-a, and ALU 225-a may store or provide the data 310-a to the same register (or another register) included in register bank 210-a. In some aspects, (not illustrated), ALU 225-a may provide the data 310-a to another ALU 225.

In another example, ALU 225-b may read and process data 305-b stored in a register included in a register bank 210-b. ALU 225-b may generate data 310-b based on processing the data 305-b, and ALU 225-b may store or provide the data 310-b (or portions of the data 310-b) to the same register (or another register) included in register bank 210-b. In some aspects, (not illustrated), ALU 225-b may provide the data 310-b to another ALU 225.

In some aspects, the register address of the register (on which data 305-a is stored) of register bank 210-a and the register address of the register (on which data 305-b is stored) of register bank 210-b may be based on an offset value common to the register bank 210-a and register bank 210-b. In some aspects, data 305 (e.g., data 305-a, data 305-b) may be referred to as a data element, and data 310 (e.g., data 310-a, data 310-b) may be referred to as an updated data element. Example aspects of the offset value are later described herein.

Referring to the example configuration 302 of FIG. 3B, the computing system 200 may provide a computation model having a relatively lower level of computational parallelism (and relatively larger register file scope) compared to the example configuration 301 of FIG. 3A, in accordance with one or more embodiments of the present disclosure.

In an example, for a computation model having a relatively lower level of computational parallelism (and relatively larger register file scope), a portion of the ALUs 225 are active, and each ALU 225 is driven by multiple register banks 210. For example, with reference to example configuration 302, half of the ALUs 225 are active, and each active ALU 225 is driven by adjacent pairs of register banks 210. In some aspects, the ALU data scope supported by example configuration 302 is doubled (with half as much parallel computation) compared to the ALU data scope of example configuration 301.

In the example configuration 302, each pair of adjacent register banks 210 is directly or indirectly coupled to an ALU 225 associated with one of the adjacent register banks 210. For example, each pair of adjacent register banks 210 may be directly or indirectly coupled to the ALU 225 via two or more multiplexers 220. In an example, register bank 210-a and register bank 210-b are each coupled to ALU 225-b via multiplexer 220-a and mux 220-b, and register bank 210-a and register bank 210-b both drive ALU 225-b.

Each ALU 225 may read and process data stored in a respective register (or registers) of either register bank 210 of a pair of adjacent register banks 210 associated with the ALU 225. In an example, each ALU 225 may store generated data to a respective register (or registers) of either register bank 210 of the pair of adjacent register banks 210. In some other aspects, (not illustrated), each ALU 225 may provide generated data to another ALU 225.

In the example illustrated at FIG. 3B, ALU 225-b, ALU 225-d, ALU 225-f, ALU 225-h, ALU 225-i, ALU 225-k, ALU 225-m, and ALU 225-o are active. In an example, ALU 225-b may read and process data 305-a stored in a register included in register bank 210-*a*, and further, read and process data 305-*b* stored in a register included in register bank 210-*b*. ALU 225-*b* may generate data 310-*b*1 based on processing data 305-*a* and data 305-*b*, and ALU 225-*b* may store or provide the data 310-*b*1 (or portions of the data 310-*b*1) to the same registers (or other registers) respectively included in register bank 210-*a* and/or register bank 210-*b*. In some other aspects, (not illustrated), ALU 225-*b* may provide data 310-*b*1 to another ALU 225.

Referring to the example configuration 303 illustrated at FIG. 3C, the computing system 200 may provide a computation model having a lowest configurable level of computational parallelism (and relatively largest configurable register file scope) compared to the example configuration 301 of FIG. 3A and example configuration 302 of FIG. 3B, in accordance with one or more embodiments of the present disclosure.

In an example, for a computation model having the relatively lowest level of computational parallelism (and relatively largest register file scope), a portion of the ALUs 225 are active, and each ALU 225 is driven by multiple register banks 210. For example, with reference to example configuration 303, two of the ALUs 225 are active, and each active ALU 225 is driven by a group (e.g., eight) of adjacent register banks 210.

In some aspects, the example configuration 303 illustrates a number of max splits (e.g., 16-fold partitioning of the register file 207) supported by the computing system 200. In accordance with one or more embodiments of the present disclosure, the computing system 200 supports configurations or modes for 16, 8, 4, 2, and 1 parallel operations on the equivalent fraction of the 2048 total registers. For example, in some embodiments, each register bank 210 may include 128 registers (e.g., 16 register banks×128 registers per register bank=2048 registers).

In the example configuration 303, each group of adjacent register banks 210 is directly or indirectly coupled to an ALU 225 associated with a register bank 210 of the group of adjacent register banks 210. For example, the group of adjacent register banks 210 may be directly or indirectly coupled to the ALU 225 via two or more multiplexers 220. In an example, register bank 210-*a* through register bank 210-*h* are each coupled to ALU 225-*f* via multiplexer 220-*e* and mux 220-*f*, and register bank 210-*a* through register bank 210-*h* all drive ALU 225-*f*.

Each ALU 225 may read and process data stored in a respective register (or registers) of each register bank 210 of a group of adjacent register banks 210 associated with the ALU 225. In an example, each ALU 225 may store generated data to a respective register (or registers) of any register bank 210 of the group of adjacent register banks 210. In some other aspects, (not illustrated), each ALU 225 may provide generated data 310 to another ALU 225.

For example, as illustrated at FIG. 3C, ALU 225-*f* and ALU 225-*i* are active. In an example, ALU 225-*f* may read and process data 305-*a* through 305-*h* respectively stored in registers included in register bank 210-*a* through register bank 210-*h*. ALU 225-*f* may generate data 310-*f* based on processing data 305-*a* through data 305-*h*, and ALU 225-*f* may store or provide the data 310-*f* (or portions of the data 310-*f*) to the same registers (or other registers) respectively included in any register bank 210-*a* through register bank 210-*h*. In some other aspects, (not illustrated), ALU 225-*f* may provide data 310-*f* to another ALU 225. ALU 225-*f* is not limited to accessing only one register in each of the register banks 210 associated with ALU 225-*f*. ALU 225-*f* can access any quantity of registers from register banks

210-*a* through 210-*h*. ALU 225-*f* can store the resulting output data in any register in register banks 210-*a* through 210-*h*.

In the examples of FIGS. 3A through 3C, in some embodiments, operations in all computation models are 256-bit operations; 8-way SIMD for 32-bit basic operations. According to one or more embodiments of the present disclosure, the computing system 200 may support dynamic changes in splits, without incurring a performance penalty (e.g., with respect to computation performance). The computing system 200 may implement the dynamic computational parallelism (e.g., dynamic changes in splits), with or without additional combinatorial logic (e.g., combinatorial logic 415 later described with reference to FIG. 4C). Example aspects of implementing the dynamic computational parallelism are further described with reference to FIGS. 4A through 4C.

Figure 4A:
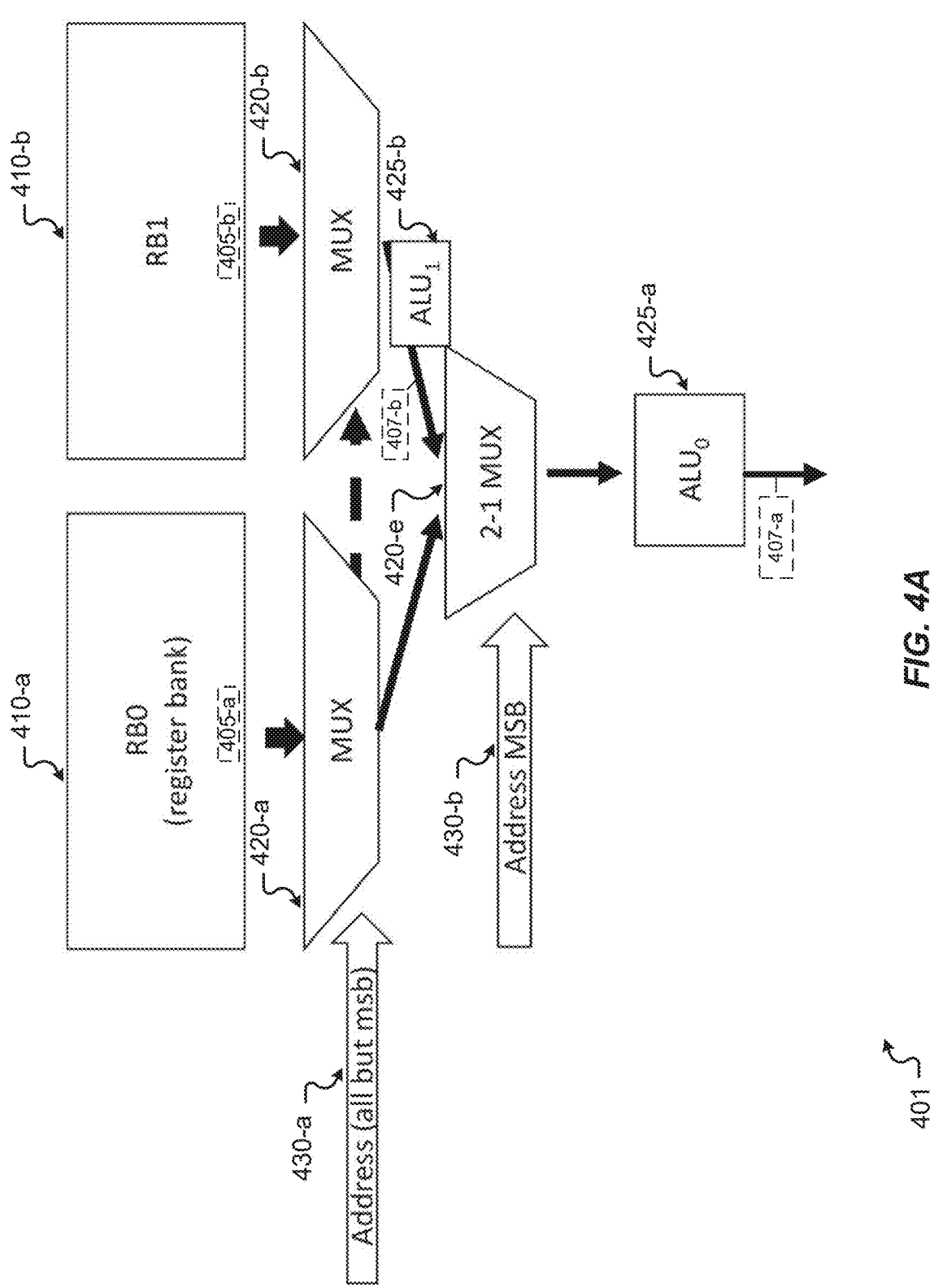
FIGS. 4A through 4C are block diagrams illustrating example aspects of a computing system in accordance with one or more embodiments of the present disclosure.
Figure 4B:
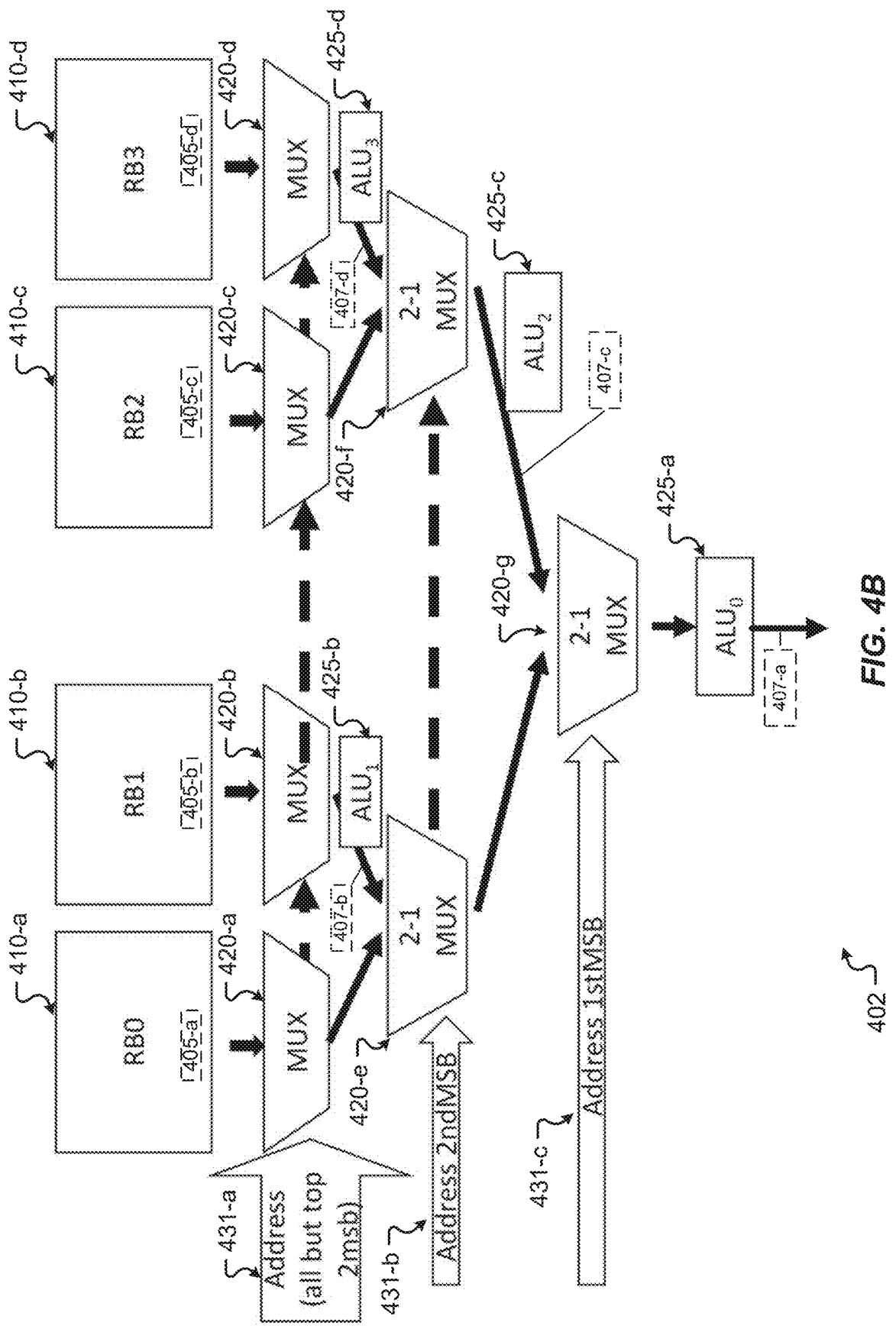
Figure 4C:
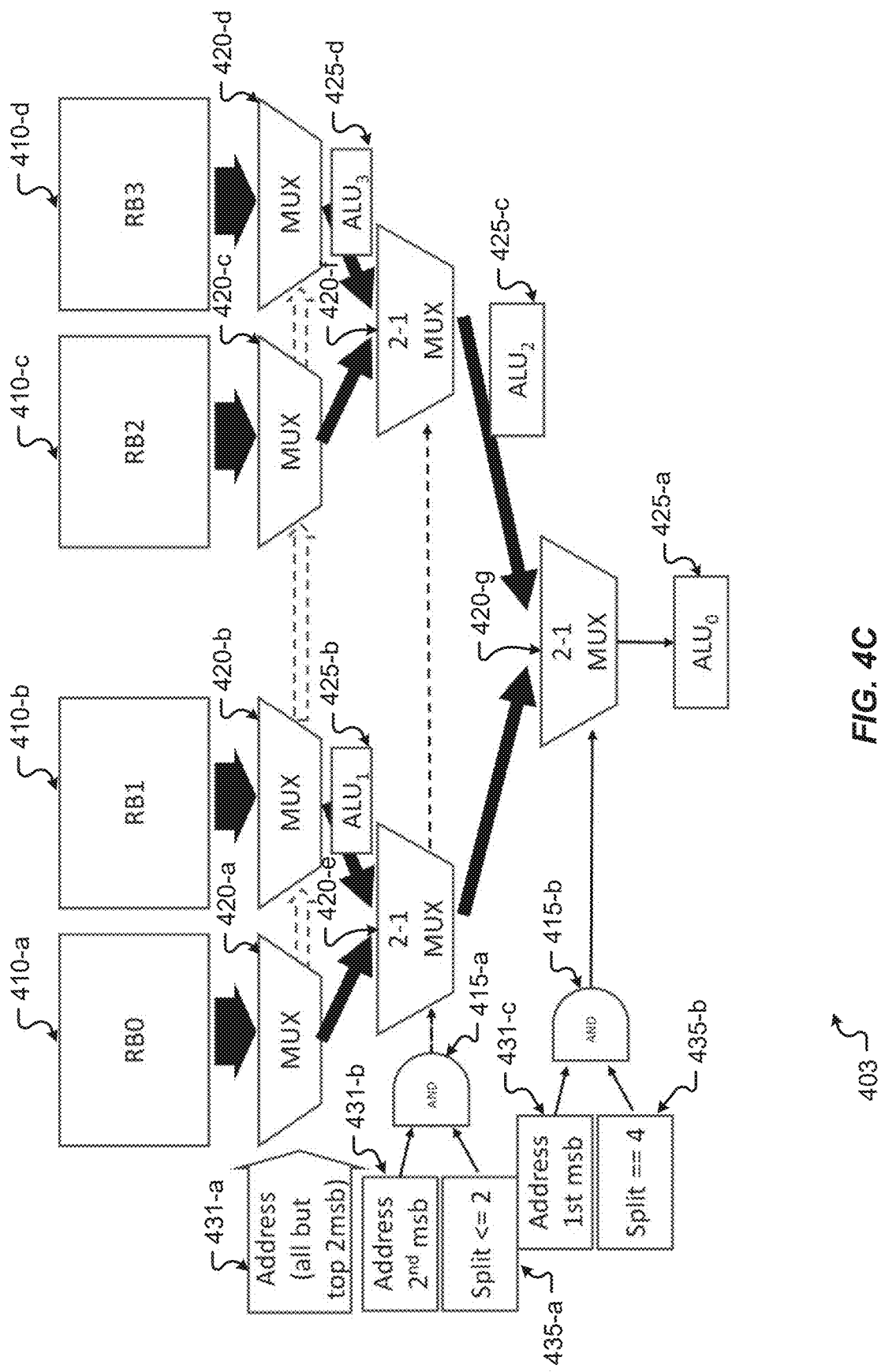

FIGS. 4A through 4C are block diagrams 401 through 403 illustrating example aspects of the computing system 200 in accordance with one or more embodiments of the present disclosure. Repeated descriptions of like elements are omitted for brevity.

The block diagram 401 of FIG. 4A illustrates an example of dynamic computational parallelism implemented by the computing system 200 using multiplexers 420. In some example embodiments, the multiplexers 420 are not dynamic-split multiplexers. In the example configuration illustrated at FIG. 4A, ALU 425-*a* (also referred to herein as ALU$_0$) and ALU 425-*b* (also referred to herein as ALU$_1$) are active ALUs.

ALU 425-*a* may be driven by register bank 410-*a* and register bank 410-*b*. Register bank 410-*a* may be electrically coupled to ALU 425-*a* via multiplexer 420-*a* (e.g., based on address information 430-*a* provided to multiplexer 420-*a* by the computing system 200) and multiplexer 420-*e* (e.g., based on address information 430-*b* provided to multiplexer 420-*e* by the computing system 200). Register bank 410-*b* may be electrically coupled to ALU 425-*a* via multiplexer 420-*b* (e.g., based on address information 430-*a* provided to multiplexer 420-*b* by the computing system 200) and multiplexer 420-*e* (e.g., based on address information 430-*b* provided to multiplexer 420-*e* by the computing system 200).

According to one or more embodiments of the present disclosure, the computing system 200 may provide an instruction (including address information 430-*a* and address information 430-*b*) to routing circuitry 212 (inclusive of multiplexers 420) based on a target configuration. In the example of FIG. 4A, multiplexer 420-*a* (e.g., based on address information 430-*a* included in the instruction) and multiplexer 420-*e* (e.g., based on address information 430-*b* included in the instruction) may couple ALU 425-*a* to data 405-*a* and register bank 410-*b*.

ALU 425-*b* may be driven by register bank 410-*b*. Register bank 410-*b* may be electrically coupled to ALU 425-*b* via multiplexer 420-*b* (e.g., based on address information 430-*a* provided to multiplexer 420-*a* by the computing system 200). In the example of FIG. 4A, multiplexer 420-*b* (e.g., based on address information 430-*a* included in the instruction) may couple ALU 425-*b* to data 405-*b* and register bank 410-*b*.

ALU 425-*a* and ALU 425-*b* may together perform operations associated with a computational datapath. In the example of FIG. 4A, register bank 410-*a* and register bank 410-*b* may be adjacent register banks 410.

In some cases, the computing system 200 may determine a target configuration based on a target parallelism (e.g., maximum computational parallelism, intermediate computational parallelism, lowest computational parallelism) and a target processing scope (e.g., maximum processing scope, intermediate processing scope, lowest processing scope) for processing data.

According to one or more embodiments of the present disclosure, the computing system 200 may provide portions of an instruction (e.g., a bit string) to multiplexer 420-a, multiplexer 420-b, and multiplexer 420-e. The instruction may indicate an operation to be performed by ALU 425-a and ALU 425-b. In some aspects, the instruction may indicate the register bank(s) 410 (and/or respective register(s) of the register bank(s) 410) from which the ALU 425-a and ALU 425-b are to access data to be computed. The instruction can include operating codes and, in some aspects, registers on which the operating code is to operate. In an example, an instruction may include an operating code and a quantity of registers given by respective binary addresses of the registers.

In one or more embodiments, the computing system 200 may provide portions of the instruction to the multiplexer 420-a, multiplexer 420-b, and multiplexer 420-e. For example, the computing system 200 may provide address information 430-a (e.g., all but the most significant bit (MSB) of the instruction) to multiplexer 420-a and multiplexer 420-b, and the computing system 200 may provide address information 430-b (e.g., the MSB of the instruction) to multiplexer 420-e.

In an example, ALU 425-b may read and process data 405-b stored in a register included in register bank 410-b. ALU 425-b may generate data 407-b based on processing data 405-b, and ALU 425-b may provide the data 407-b (or portions of the data 407-b) to ALU 425-a via multiplexer 420-e. In some other examples, ALU 425-b may provide the data 407-b (or portions of the data 407-b) to another ALU 425.

ALU 425-a may read data 405-a stored in a register included in register bank 410-a. ALU 425-a may generate data 407-a based on processing data 405-a and data 407-b, and ALU 425-a may provide the data 407-a (or portions of the data 407-a) to register bank 410-a and/or register bank 410-b. In some other examples, ALU 425-a may provide the data 407-a (or portions of the data 407-a) to another register bank 410 or another ALU 425 of the computing system 200.

The block diagram 402 of FIG. 4B illustrates another example of dynamic computational parallelism implemented by the computing system 200 using multiplexers 420. In some example embodiments, the multiplexers 420 are not dynamic-split multiplexers. The block diagram 402 includes aspects of block diagram 401 described herein, and repeated descriptions of like elements are omitted for brevity.

In one or more embodiments, the computing system 200 may provide portions of a instruction to multiplexer 420-a through multiplexer 420-g. For example, the computing system 200 may provide address information 431-a (e.g., all but the top two MSBs of the instruction) to multiplexer 420-a through multiplexer 420-d, provide address information 431-b (e.g., the second MSB of the instruction) to multiplexer 420-e and multiplexer 420-f, and provide address information 431-c (e.g., the first MSB of the instruction) to multiplexer 420-g.

In an example, ALU 425-b may read and process data 405-b stored in a register included in register bank 410-b. ALU 425-b may generate data 407-b based on processing data 405-b, and ALU 425-b may provide the data 407-b (or portions of the data 407-b) to ALU 425-a via multiplexer 420-e and multiplexer 420-g.

ALU 425-d may read and process data 405-d stored in a register included in register bank 410-d. ALU 425-d may generate data 407-d based on processing data 405-d, and ALU 425-d may provide the data 407-d (or portions of the data 407-d) to ALU 425-c via multiplexer 420-f.

ALU 425-c may read data 405-c stored in a register included in register bank 410-c. ALU 425-c may generate data 407-c based on processing data 405-c and data 407-d, and ALU 425-c may provide the data 407-c (or portions of the data 407-c) to ALU 425-a via multiplexer 420-g.

ALU 425-a may read data 405-a stored in a register included in register bank 410-a. ALU 425-a may generate data 407-a based on processing data 405-a, data 407-b, and data 407-c. ALU 425-a may provide the data 407-a (or portions of the data 407-a) to any of register bank 410-a through register bank 410-d. In some other examples, ALU 425-a may provide the data 407-a (or portions of the data 407-a) to another register bank 410 or another ALU 425 of the computing system 200.

The block diagram 403 of FIG. 4C illustrates another example of dynamic computational parallelism implemented by the computing system 200 using multiplexers 420 and combinatorial logic 415. In some example embodiments, the multiplexers 420 are not dynamic-split multiplexers, and combinatorial logic 415 is dynamic split combinatorial logic. The block diagram 403 includes aspects of block diagram 401 and block diagram 402 described herein, and repeated descriptions of like elements are omitted for brevity. For example, the block diagram 403 further includes combinatorial logic 415.

In the example illustrated at FIG. 4C, combinatorial logic 415-a and combinatorial logic 415-b are AND gates. However, aspects of the present disclosure are not limited thereto, and the computing system 200 supports using other logic gates (e.g., OR gates, XOR gates, or the like) or logic gate combinations for combinatorial logic 415-a and combinatorial logic 415-b.

In one or more embodiments, the computing system 200 may provide portions of an instruction to multiplexer 420-a through multiplexer 420-g. For example, the computing system 200 may provide address information 431-a (e.g., all but the top two MSBs of the instruction) to multiplexer 420-a through multiplexer 420-d. The computing system 200 may provide address information 431-b (e.g., the second MSB of the instruction) and a control signal 435-a (e.g., a logic signal, for example, a logic level high='Split<=2' (Yes)) to combinatorial logic 415-a. The computing system 200 may provide address information 431-c (e.g., the first MSB of the instruction) and a control signal 435-b (e.g., a logic signal, for example, where a logic level high='Split==4' (Yes)) to combinatorial logic 415.

In an example, for a case in which control signal 435-a is high (e.g., logic value of 1), the computing system 200 provides the address information 431-b (e.g., the second MSB of the instruction) to multiplexer 420-e and multiplexer 420-f. That is, for example, the computing system 200 may provide the address information 431-b (e.g., the second MSB of the instruction) to multiplexer 420-e and multiplexer 420-f, via combinatorial logic 415-a. In another example, for a case in which control signal 435-b is high (e.g., logic value of 1), the computing system 200 provides the address information 431-c (e.g., the first MSB of the instruction) to multiplexer 420-g. That is, for example, the computing system 200 may provide the address information 431-c (e.g., the first MSB of the instruction) to multiplexer 420-g, via combinatorial logic 415-b.

Accordingly, for example, using address information 431-a through address information 431-c, control signal 435-a, and control signal 435-b, the computing system 200 may control the configuration or mode for parallel operations. For example, the computing system 200 may control the level of computational parallelism and register file scope.

The data (e.g., data 305, data 405, and the like) stored, for example, at the register banks 210 and register banks 410 described herein may be referred to as data structures, data elements, or source input data structures accessible by one or more computing engines (e.g., ALUs 225, ALUs 425, and the like) described herein.

Example features of the computing system 200 in accordance with one or more embodiments of the present disclosure are now described with reference to FIG. 2, FIGS. 3A through 3C, and FIGS. 4A through 4C.

In an example, a register file 207 (also referred to herein as R) has 16*256 registers, and the register file 207 is organized such that the computing system 200 may split the register file 207 into 16 register banks (e.g., register banks 210, register banks 410) of 256 registers each. The 16 register banks may be referred to as sub-files of the register file 207 or smaller files of the register file 207. In the example description herein, the register banks are referred to as R0 through R15.

The computing system 200 may include multiplexer circuitry (e.g., multiplexers 220, multiplexers 420) configured to read any register in the register file 207 by providing an address (e.g., a bitstring described herein) which can be expressed in 12 bits (i.e. log of 16*256). In accordance with one or more embodiments of the present disclosure, the computing system 200 is capable of using the same multiplexer circuitry (e.g., [TBD]) to address and read 16 different registers, one from each of the collections of register banks 210 associated with the current register file scope, under a condition in which the 16 addresses satisfy target criteria. For example, the computing system 200 is capable of using the same multiplexer circuitry to address and read the 16 different registers, one from each of the collections of register banks 210 associated with the current register file scope under a condition in which the 16 addresses are regular (e.g., the 16 addresses have the same offset in each respective register bank 210). In an example, the common offset may be 5, and the computing system 200 may address register 5 in R0, register 256+5 in R1, register 2*256+5 in R2, and so forth.

The computing system 200 may feed the 16 parallel reads directly to 16 different computing engines (referring to herein as E0 to E15) (e.g., ALUs 225, ALUs 425) strategically placed on the chip. For example, the 16 computing engines may be placed on the chip such that the placement locations of the computing engines respect the multiplexer circuitry. The 16 computing engines can process the datum stored at the 16 registers that were read in parallel. The 16 computing engines may write back to the register files in a symmetric manner using de-multiplexer circuitry. For example, the 16 computing engines may write back to the register banks in an order or configuration symmetric to the reading from the register banks.

According to one or more embodiments of the present disclosure, the hardware structure of the computing system 200 supports various levels of splits of the register file 207. For example, additional or alternative to the described 16-way split for the case of 16 computing engines, the computing system 200 may support other splits (e.g., an 8 way-split, a 4-way split, a 2-way split, a 1-way split (i.e., no split at all)). In the example case of a 1-way split, one of the computing engines can be employed (e.g., in an active state), while the 15 remaining computing engines remain idle (e.g., in an inactive state). The computing engines are placed and wired into the multiplexer circuitry in such a manner that, for the case of the 1-way split (e.g., no split), one designated computing engine (e.g., E0) has the full addressing capability into the full register file 207. In some aspects, for the case of the 1-way split, the 15 remaining computing engines have no addressing capability into the full register file 207.

In the example case of a 2-way split, two computing engines (e.g., E0 and E8) have addressing capability into the 2-way split of the register file 207. For example, the register banks R0 to R7 are associated with one split and register banks R8 to R15 are associated with the other split. In accordance with one or more embodiments of the present disclosure, the addressing capability of the two computing engines (e.g., E0 and E8) in the mode for the 2-way split may be successfully implemented by the computing system 200 under the condition in which the same (address) offset is used into each of the two splits (e.g., similar to the case described herein for a 16-way split). Another example of a 2-way split is previously described with reference to FIG. 3C.

In the example case of a 4-way split, four computing engines (e.g., E0, E4, E8, E12) with (same offset) addressing capability are utilized into a 4-way split of register file 207. In the example case of an 8-way split, eight computing engines (e.g., E0, E2, E4, E6, E8, E10, E12, E14) with (same offset) addressing capability are utilized into an 8-way split of register file 207. Another example of an 8-way split is previously described with reference to FIG. 3B.

In accordance with one or more embodiments of the present disclosure, the computing system 200 may implement the splitting described herein, such that the splitting can change from instruction to instruction. For example, the computing system 200 may dynamically control the splitting through multiple separate instructions (e.g., subsequent instructions), in which each instruction specifies a split-level (e.g., 1-way, 2-way, and the like). The systems and techniques of the present disclosure support dynamic instruction-level splitting realized in hardware, in which associated costs for implementing the dynamic instruction-level splitting are kept relatively low (e.g., given the utilization of multiplexer circuitry as described herein).

An example for performing a 16-point NTT on the hardware architecture of the computing system 200 is described herein. In the example, the Cooley-Tukey butterfly algorithm is implemented to perform the 16-point NTT. Assume that the 16 data points are in one register each in each of the 16 splits. That is, for example, data D0 is in register 0 of R0, data D1 is in register 0 of R1, and so on. In other words, for example, the 16 data points are at offset zero in respective register banks (sub-files).

The 16-point butterfly algorithm has four (i.e., log 16) iterations. In each iteration, the computing system 200 processes 8 pairs of data elements (e.g., such that each pair is processed independently) to produce 8 pairs of updated data elements. In the 16-point butterfly algorithm, each iteration specifies a different mode of pairing. For example, the first iteration includes pairing data D0 and data D1, pairing data D2 and data D3, and continuing the pairing until satisfying a condition (e.g., until data D14 and data D15 are paired). The second iteration includes pairing data D0 and data D2, pairing data D1 and data D3, pairing data D4 and data D6, pairing data D5 and data D7, and continuing the pairing until satisfying a condition (e.g., until data D13 and data D15 are paired). The third iteration includes pairing data DO and data D4, pairing data D1 and data D5, pairing data D2 and data D6, pairing data D3 and data D7, and continuing the pairing until satisfying a condition (e.g., until all data has been paired according to the mode of pairing associated with the third iteration). The fourth iteration includes pairing data that are offset by 8 (e.g., pairing data DO with data D8, pairing data D1 with data D9, and continuing until all data has been paired according to the mode of pairing associated with the fourth iteration).

The described pairing scheme gives a butterfly effect when drawn as a circuit and hence the name. In some cases, implementing the described pairing scheme without the hardware architecture and techniques described herein can be prohibitively expensive. For example, if there were 8 parallel computing engines with arbitrary addressing ability into the register file, the four iterations can be potentially performed in 4 cycles. However, as has been described herein, such a parallel addressing capability can be prohibitively expensive, especially for cases in which thousands of such cores (each core consisting of the 8 parallel engines with its register file) are to be placed on the same chip in order to support the parallel addressing capability.

In an example according to one or more embodiments of the present disclosure, the hardware architecture of the computing system 200 is capable of implementing the same butterfly in 15 cycles. For example, the first iteration may be performed in a 8-way split of the register file, such that each of 8 computing engines (e.g., E0, E2, E4, . . . , E14) will access two registers each from its split (e.g., computing engine E0 will access two registers from R0+R1, computing engine E1 will access two registers from R2+R3, and the like). In an example, the two registers are specified by two offsets 0 and 256. Note, for example, offset 256 into R0+R1 is the same as offset 0 into R1 (as each split is 256 registers), where data D1 is located.

Accordingly, for example, with the two offsets set at 0 and 256, computing engine E0 accesses data DO and data D1, computing engine E2 accesses data D2 and data D3. As the described access matches the pairing associated with the first iteration of butterfly-NTT, the hardware architecture of the computing system 200 supports performing this first iteration in parallel in one cycle.

For the second iteration, the pairing associated with an 8-way split would not enable computing engine E0 to access data DO and data D2, as data D2 would lie in R2 (at offset zero of R2). Accordingly, for example, the second iteration may be performed in a 4-way split of the register file, which may enable computing engine E0 to access R0+R1+R2+R3. The net effect is that, in association with the 4-way split, computing engine E2 is not employed and is to remain idle, and computing engine E0 is to process two pairings, which takes two cycles. All the other pairings can be done in parallel by computing engine E4, computing engine E8, and computing engine E12, and the total time for the second iteration is 2 cycles.

By the same logic as described with reference to the second iteration, for the third iteration, each of computing engine E0 and computing engine E8 is to process 4 pairings, which takes 4 cycles. For the fourth iteration, E0 is to process all 8 pairings, which takes 8 cycles. Accordingly, for example, the hardware architecture of the computing system 200 may perform the 16-point butterfly algorithm, in which the total time is 1+2+4+8 (i.e., 15 cycles). The described hardware architecture of the computing system 200, though having a higher processing time overhead of 15 cycles compared to the example processing time overhead of 4 cycles provided by an ideal parallel processor, provides an advantageous tradeoff of reduced chip area and reduced cost.

An example of 256-point NTT is further described to further emphasize the benefits of the hardware architecture of the computing system 200 compared to the processing capability of an ideal parallel processor. The following example describes performing 256-point NTT on a 16-engine split-architecture as supported by aspects of the present disclosure and compares the processing capability of the 16-engine split-architecture to an ideal parallel processing capability.

In the 256-point NTT, assume that the data D0 to D255 is organized such that 16 data points are in each of the 16 register banks (sub-files) of register file 207. In particular, for example, data D0 to data D15 is in offset 0 to 15 in register bank R0, data D16 to data D31 is in offset 0 to 15 in register bank R1, etc. Accordingly, for example, there are 8 iterations of the butterfly (i.e., log 256, base two). Since 16 data elements are in each register bank (sub-file), the hardware architecture of the computing system 200 can perform the first 4 iterations of the butterfly in 8 cycles each (8 cycles are required to process 8 pairs). The fifth iteration onwards, the number of cycles will double. Thus, the total time taken by the hardware architecture of the computing system 200 to perform a 256-point NTT is 8+8+8+8+16+32+64+128, which is 268 cycles.

In contrast, the total time that would be taken by an ideal parallel architecture (of 16 parallel engines) to perform a 256-point NTT would be 8*8, which is 64 cycles. Again, the described hardware architecture of the computing system 200, though having a higher processing time overhead of 268 cycles compared to the example processing time overhead of 64 cycles provided by an ideal parallel processor, provides an advantageous tradeoff of reduced chip area and reduced cost. For example, the gain from much smaller silicon use as supported by the example embodiments of the present disclosure allows for placing a higher quantity of cores on the same chip, and the higher quantity of cores offsets the performance difference (e.g., the 4× slowdown) for cases in which highly parallel processing of data is to be performed as in FHE evaluations. As another data point, the total time that would be taken by a single processor system with ideal register addressing capability (i.e., register addressing capability of an ideal parallel processor) to perform a 256-point NTT would be 128*8, which is 1,024 cycles. Accordingly, for example, the described hardware architecture of the computing system 200 provides an increase in performance (e.g., about 4× faster) compared to an ideal single processor system.

The described hardware architecture and associated processing techniques can also be generalized to the case where the registers are each 256 bits long and can contain eight 32-bit words. In some embodiments, the computing engines may themselves be 8-way SIMD capable, and the hardware architecture of the computing system 200 allows further multiplying-factor of the 8-way SIMD in a dynamic-split fashion. The techniques described herein may provide computing engines that are 8-way SIMD, while mitigating increases in silicon and added circuitry for achieving the higher level parallel processing capabilities.

Example technical advantages and features of the hardware architecture and techniques described herein include faster parallel computation through per instruction dynamic scoping (e.g., dynamic scoping into register banks of ALUs). As examples of the dynamic scoping described herein may be implemented through the utilization of existing multiplexer circuitry and demultiplexer circuitry, the faster parallel computation supported by the hardware architecture described herein may be achieved while mitigating increases in added silicon. Further, the hardware architecture described herein may be a general purpose architecture capable of performing butterfly computations.

Figure 5:
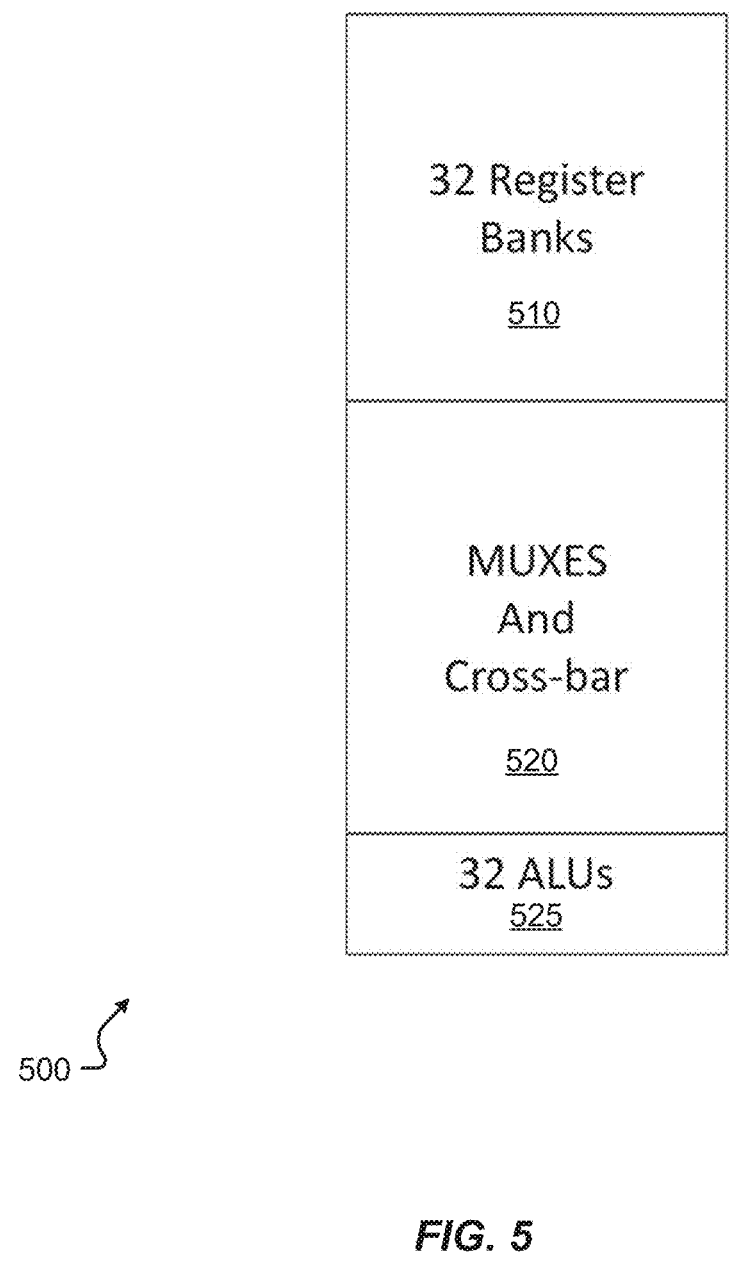

Example technical advantages and features of the hardware architecture are further described with reference to FIG. 2 and FIG. 5. For example, FIG. 5 depicts a block diagram of a computing system 500 (e.g., an IC chip) utilizing a crossbar solution of some other approaches, which differs from the hardware architecture supported by the systems and techniques described herein. The computing system 500 includes register banks 510, switching circuitry 520 (e.g., multiplexers and crossbar), and ALUs 525. In contrast, the hardware architecture of the computing system 200 is advantageously absent all-to-all crossbar circuitry. For example, in one or more of the example embodiments described herein, the hardware architecture of the computing system 200 may be implemented without all-to-all crossbar circuitry for coupling all of the register banks 210 and all of the ALUs 225.

According to one or more embodiments of the present disclosure, the added circuitry (e.g., combinatorial logic 215, multiplexers 220) and associated silicon area associated with the hardware architecture of the computing system 200 of FIG. 2 is substantially less than the circuitry associated with some crossbars solutions such as, for example, the crossbar solution of the computing system 500 of FIG. 5. In an example case in which the chip area of the computing system 500 is the same as the chip area of the computing system 200, the hardware architecture of the computing system 200 provides an increased quantity of register banks and ALUs (e.g., 64 register banks 210 and 64 ALUs 225) compared to the quantity of register banks and ALUs (e.g., 32 register banks 510 and 32 ALUs 525) supported by the architecture of the computing system 500.

In some aspects, any reduction in throughput associated with the hardware architecture of the computing system 200 may be negligible since, for the computing system 500, bringing all the data from the crossed register files into the appropriate ALUs can take many cycles. If the architecture of computing system 500 were modified to include the same quantity of ALUs (e.g., 64 ALUs) as the hardware architecture of computing system 200, the resulting silicon area would be about twice the silicon area of the computing system 200, and the throughput gain attained by the crossbar would be relatively low.

Examples of hardware support supportive of facilitating efficient loading of ALUs 225 from different offsets in the different register banks 210 is described herein. If general purpose hardware is built to load all ALUs, the silicon requirement increases up 10× (at 128 ALUs) as the following back of the envelope calculation shows 128 registers on one side and a full XBAR to 128 ALU's (4R2 W), which has a full grid of 128×256×5 (3R2 W) ports. Accordingly, 160 K×160K cross wires=25,600 M cross points of (e.g., 0.1 mu×0.1 mu)×3 layer pairs=300 M×points/MM^2=10 MM ^2 or about 10× the memory/calculation area. That is, if general purpose hardware is built to load from all register banks to all ALUs, 128×127 two-to-one multiplexers are involved instead of 128 total multiplexers with log 128=7 total wires since we use a binary tree of multiplexers.

In accordance with one or more embodiments of the present disclosure, the hardware architecture of the computing system 200 supports a relatively high amount of SIMD parallelism for algorithms that are running completely in SIMD (e.g. large matrix multiplication). In some aspects, at this level of parallelism, especially in the case of FHE, the systems and techniques described herein may prevent FFT from being the bottleneck. For example, even for cases in which FFT runs 4× slower, the time duration associated with completing the FFT is shorter than the time durations for completing other parts of the algorithms.

According to one or more embodiments of the present disclosure, the hardware architecture of the computing system 200 supports further increased gains (e.g., compared to other approaches) for implementations of the hardware architecture including larger register files and larger register banks.

The systems and techniques described herein further support increasing efficiency through a simplified programming model (e.g., instruction-level splitting described with reference to FIGS. 4A through 4C).

According to one or more embodiments of the present disclosure, the hardware architecture of the computing system 200 may include the features described herein. In some embodiments, the routing circuitry 212 includes multiplexers 220 organized in a binary tree of multiplexers with each multiplexer having a select bit.

In some embodiments, the multiplexers 220 in the routing circuitry 212 are used to read data from register(s) in the register file 207 into the computing engines (e.g., ALU 225) according to the coupling of the computing engines to the register banks (e.g., register banks 210).

In some embodiments, the coupling of computing engines to register banks and the performance of one or more computing operations is determined by a computer instruction. In some embodiments, the computer instruction includes an index of one of more register address(es) of a register bank corresponding to a computing engine according to the coupling. In some embodiments, the index is the same for all register banks.

In some embodiments, the coupling the register file (or partitions of the register file) to the compute engines can be described by a planar graph. In an example, the planar graph is a binary tree. In some examples, for a given planar graph, the coupling supported by aspects of the present disclosure couples register banks to compute engines that are physically located closely on the apparatus (e.g., computing system 200).

In some examples, regarding multiplexers 220, the select bit of each multiplexer 220 is the same for each multiplexer 220 at the same depth of the binary tree of multiplexers 220. In some embodiments, the common select bit of the multiplexers 220 at each depth in the binary tree of multiplexers 220 can be programmed to achieve the coupling of register banks to the computing engines.

FIG. 6 illustrates an example flowchart of a method 600 that in accordance with one or more embodiments of the present disclosure.

At 605, the method 600 includes determining a target configuration of a computer architecture including a register file, a plurality of computing engines, and routing circuitry. The target configuration is associated with one or more computing engines of the plurality of computing engines and one or more register banks of the register file or a partition of the register file, and determining the target configuration is based on a target parallelism and a target processing scope for processing data stored at the one or more register banks by the one or more computing engines.

At 610, the method 600 includes coupling the one or more computing engines to the one or more register banks, using the routing circuitry, based on the target configuration.

At 620, the method 600 includes performing, by the one or more computing engines and based on the target configuration, a computing operation on data stored at one or more respective registers of the one or more register banks.

In the descriptions of the flowcharts herein, the operations may be performed in a different order than the order shown, or the operations may be performed in different orders or at different times. Certain operations may also be left out of the flowcharts, one or more operations may be repeated, or other operations may be added to the flowcharts.

Various embodiments are described herein with reference to the related drawings. Alternative embodiments can be devised without departing from the scope of the present disclosure. Various connections and positional relationships (e.g., over, below, adjacent, etc.) are set forth between elements in the following description and in the drawings. These connections and/or positional relationships, unless specified otherwise, can be direct or indirect, and the present disclosure is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the present disclosure may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of #8% or 5%, or 2% of a given value.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. An apparatus comprising:
a computer architecture comprising:
a register file;
a plurality of computing engines; and
routing circuitry comprising a plurality of multiplexers and which is absent all-to-all crossbar circuitry, wherein the plurality of multiplexers comprises a binary tree of multiplexers, and each multiplexer comprised in the binary tree of multiplexers is controlled by a select bit;

wherein the apparatus is configured to:

determine a target configuration associated with one or more computing engines of the plurality of computing engines and one or more register banks of the register file or a partition of the register file, based on:

a target parallelism for processing data stored at the one or more register banks by the one or more computing engines; and a target processing scope for processing the data stored at the one or more register banks by the one or more computing engines, wherein according to the target configuration:

the one or more computing engines are in an active state; and remaining computing engines among the plurality of computing engines are in an inactive state;

couple the one or more computing engines to the one or more register banks, using the routing circuitry, based on the target configuration; and perform, by the one or more computing engines and based on the coupling and the target configuration, one or more computing operations on data stored at one or more respective registers of the one or more register banks.

2. The apparatus of claim 1, wherein the apparatus is configured to provide data from one or more registers in the register file to the computing engines, via one or more multiplexers of the plurality of multiplexers, based on the coupling.

3. The apparatus of claim 1, wherein the apparatus is configured to couple the one or more computing engines to the one or more register banks and perform the one or more computing operations based on an instruction, wherein:

the instruction comprises an index of register addresses associated with the one or more register banks coupled to the one or more computing engines; and the index comprises a plurality of register addresses associated with all register banks of the register file.

4. The apparatus of claim 1, wherein:

the coupling of the one or more computing engines to the one or more register banks is based on a planar graph; and the one or more register banks are located within a target distance of the one or more computing engines.

5. The apparatus of claim 1, wherein:

a set of multiplexers associated with a depth of the binary tree is controlled by a select bit common to the set of multiplexers, wherein the set of multiplexers are configured to couple the one or more computing engines to the one or more register banks, based on a value of the select bit.

6. The apparatus of claim 1, wherein the apparatus is configured to:

partition the register file into a plurality of register banks, wherein the plurality of register banks comprises the one or more register banks;

provide an instruction to the routing circuitry based on the target configuration, wherein the routing circuitry is configured to couple the one or more computing engines to the one or more register banks based on the instruction, and wherein the instruction comprises:

an operation; and zero, one, or a plurality of register addresses; and perform, using the one or more computing engines and based on the instruction, the one or more computing operations on the data stored at the one or more respective registers of the one or more register banks.

7. The apparatus of claim 6, wherein the apparatus is configured to:

provide a first portion of the instruction to a first portion of the routing circuitry, wherein the first portion of the instruction is absent at least a first most significant bit of a register address comprised in the instruction; and provide a second portion of the instruction to a second portion of the routing circuitry, wherein the second portion of the instruction comprises at least the first most significant bit of the register address comprised in the instruction, wherein the first portion and the second portion of the routing circuitry are configured to couple the one or more computing engines to the one or more register banks based on the first portion and the second portion of the instruction.

8. The apparatus of claim 6, wherein the apparatus is configured to:

provide a first portion of the instruction to a first portion of the routing circuitry, wherein the first portion of the instruction is absent at least a first most significant bit and a second most significant bit of the instruction;

provide a second portion of the instruction to a second portion of the routing circuitry, wherein the second portion of the instruction comprises at least the second most significant bit of the instruction; and provide a third portion of the instruction to a third portion of the routing circuitry, wherein the third portion of the instruction comprises at least the first most significant bit of the instruction, wherein the first portion, the second portion, and the third portion of the routing circuitry are configured to couple the one or more computing engines to the one or more register banks based on the first portion, the second portion, and the third portion of the instruction.

9. The apparatus of claim 8, wherein:

the second portion of the routing circuitry comprises a logical gate and one or more multiplexers; and the third portion of the routing circuitry comprises a second logical gate and one or more second multiplexers, wherein the apparatus is configured to:

provide the second portion of the instruction to the one or more multiplexers, via the logical gate; and provide the third portion of the instruction to the one or more second multiplexers, via the second logical gate.

10. The apparatus of claim 6, wherein the instruction comprises an indication of a quantity of the one or more register banks to associate with the one or more computing engines.

11. The apparatus of claim 6, wherein:

the instruction comprises a single-instruction multiple data (SIMD) instructions; and the one or more computing operations comprise one or more SIMD operations.

12. The apparatus of claim 1, wherein the apparatus is configured to modify the target parallelism and the target processing scope, wherein the modification of the target parallelism and the target processing scope comprises:

an increase in the target parallelism and a decrease of the target processing scope; or a decrease in the target parallelism and an increase of the target processing scope.

13. The apparatus of claim 1, wherein, in association with the target configuration:

the data is stored across respective first registers of a plurality of register banks of the register file;

the one or more computing engines are configured to access the data stored at the respective first registers of the plurality of register banks based on respective addresses of the respective first registers; and the respective addresses are based on an offset value common to the plurality of register banks.

14. The apparatus of claim 1, wherein the apparatus is configured to, based on the target configuration:

respectively couple the plurality of computing engines to a plurality of register banks of the register file, using the routing circuitry; and perform, using the plurality of computing engines, the one or more computing operations on the data, wherein the data is stored across respective first registers of the plurality of register banks of the register file, wherein the plurality of computing engines respectively access portions of the data from the respective first registers of the plurality of register banks.

15. The apparatus of claim 1, wherein the apparatus is configured to, based on the target configuration:

couple a first computing engine of the plurality of computing engines to two or more first register banks of a plurality of register banks of the register file, using the routing circuitry; and perform, using the first computing engine, the one or more computing operations on a first portion of the data, wherein the first portion of the data is stored at respective first registers of the two or more first register banks.

16. The apparatus of claim 1, wherein the apparatus is configured to, based on the target configuration:

couple a first computing engine of the plurality of computing engines to all register banks of the register file, using the routing circuitry; and perform, using the first computing engine, the one or more computing operations on the data, wherein the data is stored at respective first registers of all the register banks of the register file.

17. A computer-implemented method comprising:

determining a target configuration of a computer architecture comprising;

a register file, a plurality of computing engines, and routing circuitry comprising a plurality of multiplexers and which is absent all-to-all crossbar circuitry, wherein the plurality of multiplexers comprises a binary tree of multiplexers, and each multiplexer comprised in the binary tree of multiplexers is controlled by a select bit, wherein:

the target configuration is associated with one or more computing engines of the plurality of computing engines and one or more register banks of the register file or a partition of the register file; and determining the target configuration is based on:

a target parallelism for processing data stored at the one or more register banks by the one or more computing engines; and a target processing scope for processing the data stored at the one or more register banks by the one or more computing engines, wherein according to the target configuration:

the one or more computing engines are in an active state; and remaining computing engines among the plurality of computing engines are in an inactive state;

coupling the one or more computing engines to the one or more register banks, using the routing circuitry, based on the target configuration; and performing, by the one or more computing engines and based on the target configuration, a computing operation on data stored at one or more respective registers of the one or more register banks.

18. A computing system having a memory having computer readable instructions and one or more processors for executing the computer readable instructions, the computer readable instructions controlling the one or more processors to perform operations comprising:

determining a target configuration of a computer architecture comprising:

a register file, a plurality of computing engines, and routing circuitry comprising a plurality of multiplexers and which is absent all-to-all crossbar circuitry, wherein the plurality of multiplexers comprises a binary tree of multiplexers, and each multiplexer comprised in the binary tree of multiplexers is controlled by a select bit, wherein:

the target configuration is associated with one or more computing engines of the plurality of computing engines and one or more register banks of the register file or a partition of the register file; and determining the target configuration is based on:

a target parallelism for processing data stored at the one or more register banks by the one or more computing engines; and a target processing scope for processing the data stored at the one or more register banks by the one or more computing engines, wherein according to the target configuration:

the one or more computing engines are in an active state; and remaining computing engines among the plurality of computing engines are in an inactive state;

coupling the one or more computing engines to the one or more register banks, using the routing circuitry, based on the target configuration; and performing, by the one or more computing engines and based on the target configuration, a computing operation on data stored at one or more respective registers of the one or more register banks.

*   *   *   *   *